US010041188B2

(12) United States Patent
Brang et al.

(10) Patent No.: US 10,041,188 B2
(45) Date of Patent: Aug. 7, 2018

(54) METHOD AND APPARATUS FOR PRODUCTION OF MELTBLOWN NANOFIBERS

(75) Inventors: James E. Brang, Cocoa, FL (US); Arnold Wilkie, Merritt Island, FL (US); Jeff Scott Haggard, Cocoa, FL (US)

(73) Assignee: HILLS, INC., Melbourne, FL (US)

( * ) Notice: Subject to any disclaimer, the term of this patent is extended or adjusted under 35 U.S.C. 154(b) by 467 days.

(21) Appl. No.: 11/736,399

(22) Filed: Apr. 17, 2007

(65) Prior Publication Data

US 2008/0023888 A1    Jan. 31, 2008

Related U.S. Application Data

(60) Provisional application No. 60/792,671, filed on Apr. 18, 2006, provisional application No. 60/894,939, filed on Mar. 15, 2007.

(51) Int. Cl.
| | | |
|---|---|---|
| *D01D 5/098* | (2006.01) | |
| *D01D 4/02* | (2006.01) | |
| *B29C 47/08* | (2006.01) | |
| *B29C 47/88* | (2006.01) | |
| *B29C 47/00* | (2006.01) | |

(52) U.S. Cl.
CPC ........... *D01D 4/025* (2013.01); *D01D 5/0985* (2013.01); *B29C 47/0014* (2013.01); *B29C 47/0816* (2013.01); *B29C 47/0859* (2013.01); *B29C 47/8815* (2013.01)

(58) Field of Classification Search
CPC .. D01D 4/025; D01D 5/0985; B29C 47/0014; B29C 47/0816; B29C 47/0859; B29C 47/8815

USPC ............... 425/7, 72.2, 192 S, 382.2, 464
See application file for complete search history.

(56) References Cited

U.S. PATENT DOCUMENTS

| | | | | |
|---|---|---|---|---|
| 3,825,380 A | * | 7/1974 | Harding et al. ............. 425/72.2 |
| 3,849,241 A | * | 11/1974 | Butin et al. .................. 428/137 |
| 5,061,170 A | * | 10/1991 | Allen et al. .................. 425/197 |
| 5,075,161 A | | 12/1991 | Nyssen et al. | |
| 5,498,463 A | | 3/1996 | McDowall et al. | |

(Continued)

FOREIGN PATENT DOCUMENTS

| | | |
|---|---|---|
| EP | 0646663 A1 | 4/1995 |
| JP | 62090320 A | 4/1987 |

(Continued)

OTHER PUBLICATIONS

European Search Report dated Mar. 19, 2010.

(Continued)

*Primary Examiner* — Yogendra N Gupta
*Assistant Examiner* — Joseph S Leyson
(74) *Attorney, Agent, or Firm* — Edell, Shapiro & Finnan, LLC

(57) ABSTRACT

An apparatus for producing polymeric nanofibers utilizes a meltblown spinneret die having spin holes formed by grooves in plate(s) surface(s) of plate(s) where polymer exits at the plate(s) edge(s). The grooves are smaller than 0.005" wide×0.004" deep and have an L/D at least as large as 20:1. Flow rates of polymer through the apparatus are very low, on the order of 0.01 ghm or less. A meltblown fabric having fibers mostly less than 0.5 microns in diameter is produced.

27 Claims, 2 Drawing Sheets

(56) References Cited

U.S. PATENT DOCUMENTS

| | | | |
|---|---|---|---|
| 5,679,379 A | | 10/1997 | Fabbricante et al. |
| 6,114,017 A | | 9/2000 | Fabbricante et al. |
| 6,833,104 B2 | * | 12/2004 | Berger .......................... 264/555 |
| 6,946,093 B2 | | 9/2005 | Allen |
| 7,316,552 B2 | * | 1/2008 | Haynes et al. ............... 425/72.2 |
| 2005/0048152 A1 | | 3/2005 | Gerking |
| 2005/0053782 A1 | * | 3/2005 | Sen et al. ...................... 428/364 |

FOREIGN PATENT DOCUMENTS

| | | |
|---|---|---|
| JP | 6166945 A | 6/1994 |
| WO | WO03080905 * | 10/2003 |

OTHER PUBLICATIONS

JP Office Action received in Japanese Application No. 2009-506734 dated Mar. 7, 2012.
Ward, G., "Meltblown Nanofibres for Nonwoven Filtration Applications", Filtration and Separation, the United Kingdom, Elsevier Advanced Technology, Nov. 2001, vol. 38, No. 9, pp. 42-43.

* cited by examiner

METHOD AND APPARATUS FOR PRODUCTION OF MELTBLOWN NANOFIBERS

CROSS REFERENCE TO RELATED APPLICATION

This application claims priority from U.S. Provisional Patent application Ser. Nos.:
(a) 60/792,671 entitled "Spin Pack With Long Small Holes," filed Apr. 18, 2006; and
(b) 60/894,939, entitled "Nanofiber Meltblown Production Method, Process & Apparatus", filed Mar. 15, 2007.
The disclosures in these provisional patent applications are incorporated herein by reference in their entireties.

FIELD OF THE INVENTION

The present invention pertains to improved methods and apparatus for producing polymeric nanofibers and, more particularly to improvements in meltblown technology that permit production of polymeric nanofibers of small cross-section at a rate suitable for commercial operation. The invention also encompasses webs and fabrics produced by the aforesaid methods and apparatus.

BACKGROUND

As commonly used in discussing polymeric fibers, "nanofibers" refers to fibers with "diameters" (i.e., maximum transverse cross-section dimension) less than 0.5 microns (i.e., $0.5 \times 10^{-6}$ meters). Typical polymeric nanofibers have diameters between 50 and 300 nanometers (i.e., between $0.05 \times 10^{-6}$ and $0.3 \times 10^{-6}$ meters). Nanofibers provide for improved barrier fabrics for clothing and other applications, such as filtering. Only small quantities of nanofibers on the surface of meltblown fabrics greatly enhance liquid retention and decrease water contact angle. Other factors such as air resistance and breathability are also favorably impacted as nanofibers are added to a nonwoven fabric. These advantages notwithstanding, nanofibers have had limited commercial applicability, primarily because the production costs are too high.

The most common technique currently used for commercially producing nanofibers is electrospinning. In this technique a polymer is typically dissolved in a solvent (although polymer melts may also be used) and placed in a glass pipette tube sealed at an upstream end and having a small opening in a necked-down portion at the downstream end. A high voltage (>50 kV) is then applied between the polymer solution and a collector near the open downstream end of the pipette. This process can produce nanofibers with diameters as low as fifty nanometers, although the collected web usually contains fibers with varying diameters from fifty nanometers to two microns. The production rate of this process is very low and is typically measured in grams per hour, much too low to have wide commercial applicability. Moreover, the concentration of polymer in the solvent tends to be low (on the order of 10%) thereby further reducing the effective production rate and, if the system is operated at high volume, the operator is forced to contend with significant amounts of solvent and noxious off-gas byproducts. Further, switching the type of polymer that can be used in this process typically requires extensive machine modifications It would be more desirable to use meltblown techniques to produce polymeric nanofibers. However, conventional meltblown webs have fiber diameters ranging from about one micron to ten microns. These webs are typically used for filtration applications, and the lowest possible fiber diameters are desirable because they offer better filtration efficiencies. Conventional meltblown spinning technology is limited to two microns because of the inability to make sufficiently small spin holes (i.e., spinning orifices). Typically, the spin hole diameters cannot be made smaller than approximately 0.005 inch and have an L/D (length over diameter) ratio of less than approximately 10.

An efficient use of meltblown technology is disclosed in U.S. Pat. No. 6,833,104 (Berger). The entire disclosure in that patent is expressly incorporated herein by reference. The spinneret disclosed in that patent includes a plate having channels etched or otherwise defined in a surface thereof, each channel having a downstream end extending to the edge of the plate. The plate surface is covered with a similarly configured plate (i.e., with correspondingly defined passages) or a flat plate to define closed flow passages, and the downstream ends serve as a lineal array of spinning orifices at the plate edge. Molten polymer is delivered to the upstream ends of the passages from a polymer source through a filter. The out-flowing polymer filaments or fibers flow parallel to the plate surfaces in which the spinning orifices are defined. For purposes of the description and claims herein, this type of spinneret will be referred to as a plate edge orifice spinneret (i.e., having plate edge spinning orifices in a linear array) to distinguish it from the spinneret type such as disclosed in U.S. Pat. No. 5,162,074 (Hills) in which the filaments are spun perpendicularly to the spinneret plate surface from which they emanate. Plate edge orifice spinnerets have been unable to produce fibers having diameters smaller than about 0.8 microns. It would be extremely valuable from a commercial perspective to be able to produce nanofibers from a meltblown process using plate edge orifice spinnerets with a commercially practical productivity rate.

SUMMARY OF THE INVENTION

It is an object of the invention to provide an improved method and apparatus for using meltblown techniques to produce polymeric nanofibers at a commercially practical production rate.

It is another object of the invention to provide an improved plate edge orifice spinneret capable of producing nanofibers of the same size and the same or better quality as those produced using electrospinning techniques, at higher production rates, lower cost, and without the need to deal with noxious fumes.

According to the present invention, a plate edge orifice spinneret (i.e., a system of the general type disclosed in U.S. Pat. No. 6,833,104) is significantly modified to provide spinning orifices having a large L/D (length divided by diameter) ratio with a very small spinning orifice diameter, and is operated with a throughput or polymer flow rate that is very low. To compensate for the productivity reduction caused by the low throughput, the density of the small spinneret orifices (or "spin holes") can be increased, a feature that is enabled by the small spin hole diameter. It is to be understood that the cross-section of the spin holes is typically not circular and that the "D" dimension as used herein is intended to mean the maximum transverse cross-section dimension of the spin hole.

More particularly, the present invention utilizes a plate edge orifice spinneret wherein:

the spin hole L/D ratios are 20/1 or greater, preferably as high as 200/1 or even 1,000/1;

flow rates less are than 0.01 ghm (grams per hole per minute); and spin holes are arranged in linear arrays with a density of 99 holes per inch or more, in some cases greater than 199 holes per inch.

The present invention enhances meltblown technology of the type described in the aforementioned Berger patent to allow production of a nonwoven web with the same size nanofibers as those produced by electrospinning processes. The end product is the same but the production rate is much higher, the cost is much lower and there are no byproduct noxious fumes. In addition, a greater variety of polymers can be used without extensive machine modifications. With the present invention, webs can be made with most of the fibers less than 0.5 micron in diameter and at production rates of 1.5 kg/meter/hour or higher.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DESCRIPTION OF THE PREFERRED EMBODIMENTS

Figure 1:
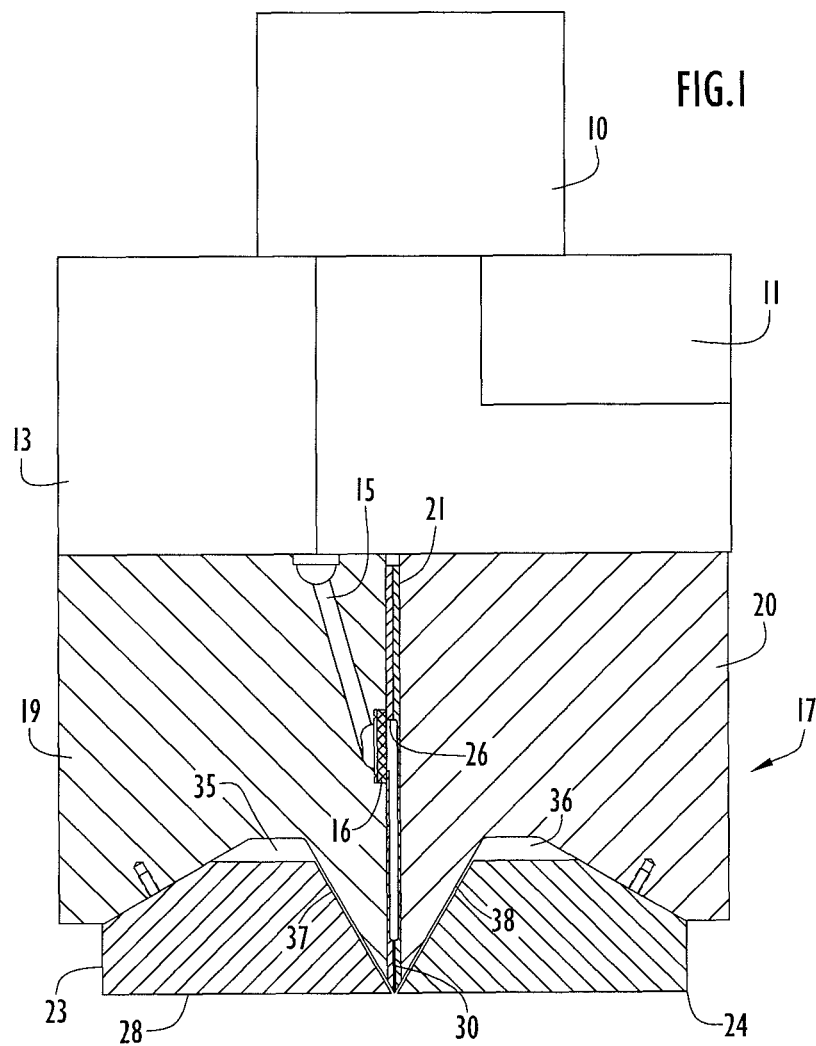
FIG. 1 is a partially schematic view in longitudinal section of a preferred embodiment of a spinning assembly employing a plate edge orifice spinneret according to one aspect of the invention.

The following detailed explanations of the drawings and of the preferred embodiments reveal the methods and apparatus of the present invention.

Referring more specifically to the drawings, a pump 10 delivers molten polymer received from a polymer inlet 11 to pump block 13 where the polymer is metered and delivered to an inlet manifold 15 of a meltblown spinneret pack 17. The meltblown spinneret pack 17 comprises a first block 19 and a second block 20 secured in close relation to one another along respective surfaces and to respective air jet blocks 23, 24 proximate the downstream or outflow end of the unit.

Figure 2:
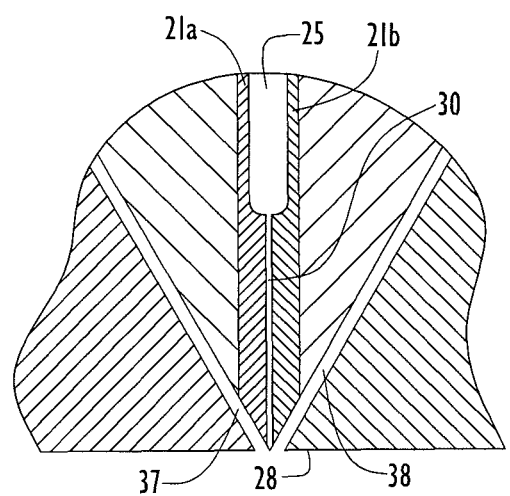
FIG. 2 is an enlarged detail view in longitudinal section of the outlet end of the assembly of FIG. 1.
Figure 3:
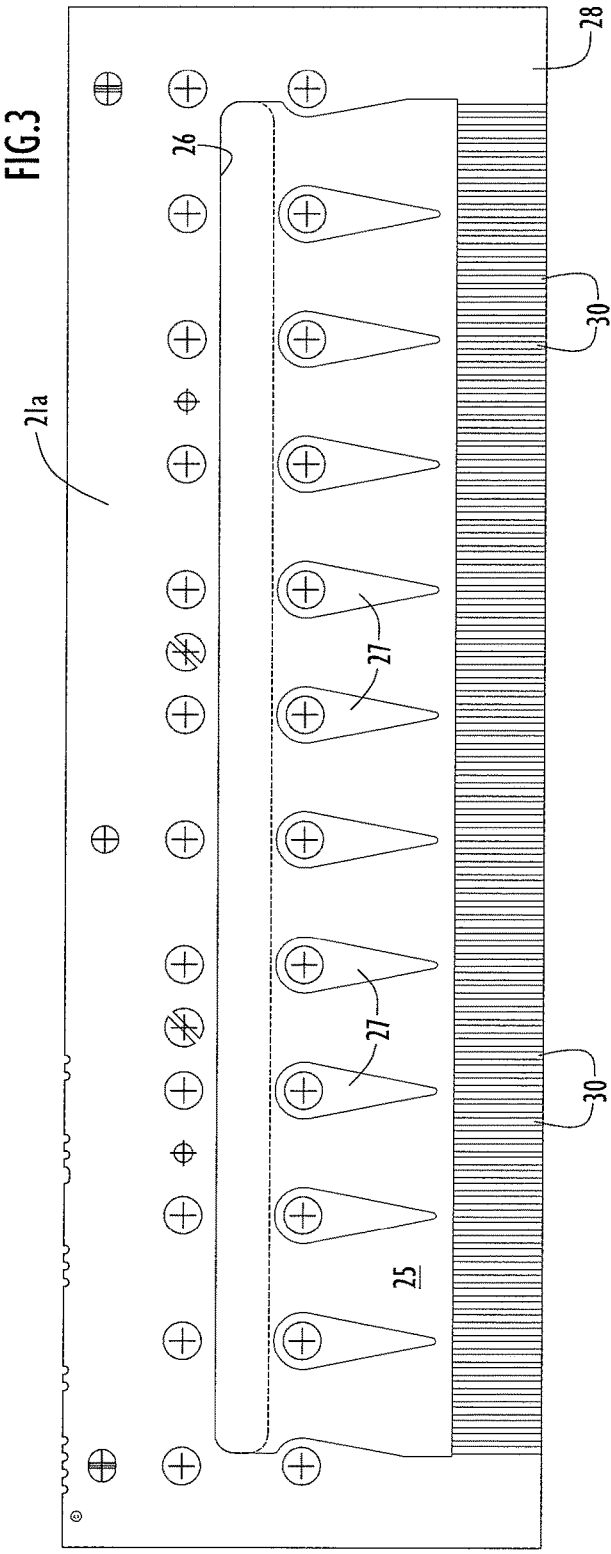
FIG. 3 is a top view in plan of the channeled surface of one of the plates of the plate edge orifice spinneret employed in the assembly of FIG. 1.
Figure 5:
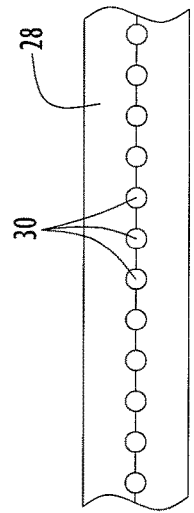
FIG. 5 is a view in elevation of a portion of the edge of the plate edge orifice spinneret of FIG. 3 showing the array of spin holes.
Figure 4:
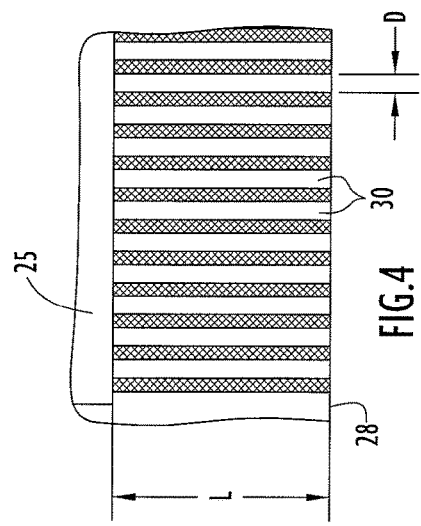
FIG. 4 is an enlarged detail view in plan of a portion of the channeled surface of FIG. 3.

Between blocks 19 and 20 there is a thin plate spinneret 21 which, in the preferred and illustrated embodiment, comprises two thin plates 21a and 21b joined flush against one another in any suitable manner. Thin plates 21a and 21b have shallow channels and passages etched or otherwise formed in their abutting surfaces in a pattern that is the same for both plates. Thus, when the plates are superposed, one on the other, each plate provides one half of each flow region or passage for the overall thin plate spinneret. In the preferred embodiment, the only significant difference between plates 21a and 21b is the through hole or opening 26 defined in plate 21a serving as in inlet for the thin plate spinneret to receive molten polymer from inlet manifold 15 through a filter 16 extending across the downstream end of manifold 15. The channels and passages formed in plate 21a, as illustrated on FIG. 3, include a spinneret reservoir region 25 for receiving polymer at elongated opening 26 from filter 16 (FIG. 2). Opening 26 extends most of the length of plate 21a, and inflowing polymer is directed into reservoir region 25 in a direction transverse to the length dimension of opening 26. Flow dividers 27, raised from the base of the recessed reservoir region, distribute the flow evenly as it proceeds toward the outlet edge 28 of the spinneret plates. Defined by superposed recesses in each plate 21a and 21b, downstream of reservoir region 25, are multiple long and narrow spin holes 30 extending perpendicular to the length dimension of opening 26 and edge 28 in a parallel array from the reservoir region 25 to plate edge 28. Each spin hole 30 is formed by two superposed semi-cylindrical, rectangular or other shaped recesses in the plates 21a and 21b. The spinneret plates are secured together by any conventional manner such a bonding, clamping, welding, etc.

Relatively large spaces are provided between spinneret block 19 and air jet block 23, and between spinneret block 20 and air jet block 24, upstream of edge 28 to define respective reservoirs 35 and 36 for receiving pressurized draw air in a conventional manner from an air supply (not shown). These reservoirs deliver the draw air through significantly narrower spaces between the blocks serving as wide air nozzles 37, 38 extending into the plane of the drawings in FIGS. 1 and 2. Nozzles 37, 38 are directed at converging similar angles relative the linear array of spin holes 30 and have their downstream ends terminating at edge 28 along respective sides of that linear array to issue the draw air angularly toward the spun nanofibers as the fibers emanate from spin holes 30.

The component described above are similar in many respects to those described in the aforementioned Berger patent, although it should be noted that the preferred embodiment disclosed in that patent produces bicomponent fibers of greater thickness than nanofibers, whereas the preferred embodiment of the present invention is concerned with producing homopolymer nanofibers. Thus, where the spinneret in the Berger patent includes two polymers being fed to the spinning section from opposite sides of that section, the primary embodiment disclosed herein is typically a homopolymeric spinneret wherein a single polymer is delivered to the thin plate 21. It should be noted that the present invention can also be used to produce bicomponent or multicomponent nanofibers, in which case the assembly may be modified to deliver different polymers to the spinneret plate.

An important aspect of the invention is the ratio (L/D) of the length L of each spin hole to the diameter (or maximum transverse cross-section dimension) D of that hole is very large in comparison to the ratios employed in prior art units. In particular, L/D ratios of at least 20 are employed. In preferred embodiments of the invention, the L/D ratio is in excess of 200, or even 1,000.

Another important feature of the invention is that the flow rate of polymer through the unit is far lower that used in conventional systems. Pump block 13 delivers the molten polymer to the spinneret at a flow rate per spin hole that is less than 0.01 ghm. The low throughput of polymer resulting from this low flow rate is compensated for by the fact that the very small spin hole diameters permits high lineal densities of the spin holes 30. Specifically, densities on the order of one hundred spin holes per inch and greater can readily be achieved, thereby enabling a commercially realizable productivity from a machine of reasonable size. In some cases spin hole densities on the order of two hundred holes per inch can be achieved.

In one preferred embodiment, the following parameters are employed:

Polymer flow rate: 0.007 ghm (grams/hole/minute)
Spin hole size: D=0.12 mm (0.0047"); L=18 mm (0.71") long (or longer)–(L/D>150)
Polymer: PP (polypropylene) having an 1800 MFI (melt flow index)
Operating Temperature: 250° C.
Air Jet gap: 0.35 mm (0.0138")

In another exemplary embodiment the unit has a density of about 100 spin holes per inch, a flow rate of 0.007 ghm, D is approximately 0.005" (0.127 mm), L is approximately 0.3" (7.62 mm)–(L/D≈60), the polymer is PP-1800 MFI and the operating temperature is 250° C.

It is understood, of course, that these are merely exemplary sets of acceptable operating parameters for the present invention and that variation ranges of these parameters can be considerable, depending on the desired nanofibers product, and still reside with the scope of the present invention. Specifically, acceptable parameter ranges are at least the following:

Polymer flow rate: less than 0.01 ghm
Spin hole size: L/D>20; where the cross-sectional dimensions are on the order of 0.005" wide and 0.004" deep (0.127 mm wide and 0.102 mm) or smaller
Polymer: Any melt spinnable polymer including, but not limited to PP; PET; PA-6; PA 6-6; PE; HDPE; UHMWPE; TPU; LCP; PFE; Co-PET; Co-PA; PLA
Operating Temperature: As necessary to melt polymer to flowability, typically 250° C. or greater.

The flow passages forming the spin holes 30 are typically photo-chemically etched in the surfaces of the thin spinneret plates 21a and 21b. However, other known techniques for defining small passages in metal or other solid surfaces may be employed.

According to the principles of the invention, the spin holes 30 must be long to develop back pressure for even polymer flow distribution. By way of explanation, reference is made to the following table which provides a comparison of spin hole lengths vs. polymer pressures:

TABLE

[For a 0.12 mm (0.0047") diameter spin hole and using 1800 MFI PP]

| L/D | Pressure (psi) |
|---|---|
| 10 | 27 (current industry practice) |
| 60 | 165 |
| 100 | 275 |
| 150 | 410 |
| 200 | 550 |

To assure the best nonwoven web uniformity, polymer operating pressures on the order, preferably, of at least 400 psi are required.

The apparatus of the invention, in a broad sense, may be viewed as a meltblown spinneret die that has the spin holes formed by grooves in the surface of plate(s) where the polymer exits at the edge of the plate. The grooves are smaller than 0.005" wide×0.004" deep and have an L/D at least as large as 20:1. In a preferred embodiment, at edge 28 the tip of the spin hole has a flat section 0.002"×0.030" across the spin hole.

The method of the invention, in a broad sense, may be viewed as a meltblown process for making a web of fibers that are mostly less than 0.5 microns in diameter by extruding polymer into the meltblown die described above. Any melt spinnable polymer may be employed.

The invention may also be viewed as including a meltblown fabric having fibers mostly less than 0.5 microns in diameter, preferably made using the method and apparatus described above. Also included in the invention is a fabric comprising spunbond and meltblown layers with one or more of the meltblown layers being a meltblown fabric having fibers mostly less than 0.5 microns in diameter.

As noted above, the production rate of nanofibers using the present invention may be low compared to the production rate for producing conventional larger fibers using conventional meltblown technology. However, compared to other known methods for producing nanofibers (e.g., electrospinning), the present invention has much higher nanofibers production rates. Specifically, electrospinning is a solvent spinning process wherein the concentration of polymer tends to be low in the solvent, typically on the order of ten percent. Thus, the production is low, and if performed to produce large volume, the resulting solvent and noxious off-gas byproducts must be dealt with. One manufacturer who employs electrospinning to produce polymeric nanofibers reports production rates on the order of 10,000 square meters per day. The present invention exceeds that rate by orders of magnitude.

In the preferred embodiment described herein, two etched plates 21a and 21b are employed. The plates are typically positioned to align the flow channels and regions and then bonded together to form a single spinneret plate 21. However, the plates need not be bonded together but instead can be clamped, bolted, glued, or otherwise secured to one another. If the plates are not bonded, cleaning of the flow channel is more easily accomplished by separating the plates. In this regard, spin holes as small as those used herein tend to clog more readily than spin holes of conventional size, making a non-bonding approach more appealing for cleaning purposes. Thus, the present invention may be embodied either way (either with bonded or non-bonded plates).

Although two identical plates 21a and 21b are described herein as comprising the spin plate assembly 21, it should be noted that the flow passages can be defined in the surface of only one plate, and that surface would be covered by a flat plate secured thereto. Also, if two etched plates are used, they can be superposed with the channels forming the spin holes slightly offset in a transverse direction so that each channel is part of two spin holes and, thereby, the spin hole density can be approximately doubled. Each array could share a common set of air knives, or preferably have its own set of air knives, to heat the extruded fibers.

A single linear array of spin holes is shown in the preferred embodiment; however, it will be understood that two or more parallel arrays can be employed as the application requires.

The preferred embodiment is described in terms of recessed channels or grooves defined in the surface of one or more plates. However, it will be recognized by those skilled in the art that the flow regions and passages can be formed as through holes defined entirely through a plate and sealed by additional plate surfaces disposed adjacent opposite plate sides.

Having described preferred embodiments of new and improved methods and apparatus for producing polymeric nanofibers, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A nanofiber meltblown fiber spinning device into which molten polymer is fed comprising:
    at least a first flow distribution plate having an outflow edge and a pattern of flow regions defined therein, said pattern of flow regions comprising a reservoir portion for receiving polymer fed to the device and a plurality of spinning orifices defined as respective long, narrow, parallel flow passages, said spinning orifices being positioned in flow communication with said reservoir and extending to said outflow edge such that nanofibers of said polymer are extruded from said spinning orifices, said plate having a plate thickness defined between first and second opposite plate surfaces, wherein said flow regions are grooves that include said spinning orifices and are recessed in said first surface to a depth less than said thickness;
    wherein said spinning orifices are long and narrow spin holes having a length L and a maximum transverse dimension D and the ratio L/D is equal to or greater than twenty; and
    wherein said spinning device is configured to form said nanofibers such that when polymer flows through said spinning orifices at low flow rates of 0.01 grams per spinning orifice per minute or less a majority of the formed fibers have a diameter less than 0.5 micron.

2. The spinning device of claim 1 wherein the spinning device is configured to facilitate a feeding of polymer to said reservoir portion at a flow rate per spinning orifice of approximately 0.01 grams per spinning orifice per minute or less.

3. The spinning device of claim 1 wherein said spinning orifices at said outflow edge are arranged in a substantially linear array having a density greater than one hundred holes per inch.

4. The spinning device of claim 1 wherein said spinning orifices at said outflow edge are arranged in a substantially linear array having a density of at least two hundred holes per inch.

5. The spinning device of claim 1 wherein L/D is between one hundred and one thousand.

6. The spinning device of claim 1 wherein said grooves of said spinning orifices are photo-chemically etched in said distribution plate and have cross-sections that are no greater than 0.005 inch wide and 0.004 inch deep.

7. A nanofiber meltblown fiber spinning device into which molten polymer is fed comprising:
    at least a first flow distribution plate having an outflow edge and a pattern of flow regions defined therein, said pattern of flow regions comprising a reservoir portion for receiving polymer fed to the device, and a plurality of spinning orifices defined as respective long, narrow, parallel flow passages, said spinning orifices being positioned in flow communication with said reservoir and extending to said outflow edge such that nanofibers of said polymer are extruded from said spinning orifices, said plate having a plate thickness defined between first and second opposite plate surfaces, wherein said flow regions are grooves that include said spinning orifices and are recessed in said first surface to a depth less than said thickness;
    wherein said spinning device is configured to form fibers such that a majority of the formed fibers have a diameter less than 0.5 micron, wherein said spinning orifices are long and narrow spin holes having a length L and a maximum cross-section dimension D no greater than 0.005 inch wide and are arranged in a substantially linear array having a density greater than one hundred holes per inch, and wherein the ratio L/D is equal to or greater than one hundred.

8. The spinning device of claim 7 wherein said spinning orifices at said outflow edge are arranged in a substantially linear array having a density of at least two hundred holes per inch.

9. The spinning device of claim 1 further comprising:
    at least one source of said molten polymer; and
    a pump unit for feeding said polymer from said source to said device.

10. The spinning device of claim 7 further comprising:
    at least one source of said molten polymer; and
    a pump unit for feeding said polymer from said source to said device.

11. The spinning device of claim 9, wherein the spinning device and said pump unit are configured to facilitate feeding of said molten polymer from said at least one source to said reservoir portion at a flow rate per spinning orifice of approximately 0.01 grams per spinning orifice per minute or less.

12. The spinning device of claim 10, wherein the spinning device and said pump unit are configured to facilitate feeding of said molten polymer from said at least one source to said reservoir portion at a flow rate per spinning orifice of approximately 0.01 grams per spinning orifice per minute or less.

13. A nanofiber meltblown fiber spinning device into which molten polymer is fed comprising:
    at least a first flow distribution plate having an outflow edge and a pattern of flow regions defined therein, said pattern of flow regions comprising a reservoir portion for receiving polymer fed to the device and a plurality of spinning orifices defined as respective long, narrow, parallel flow passages, said spinning orifices being positioned in flow communication with said reservoir and extending to said outflow edge such that nanofibers of said polymer are extruded from said spinning orifices, wherein said plate has a plate thickness defined between first and second opposite plate surfaces, and said flow regions comprise grooves that define at least a portion of said spinning orifices and that are recessed in said first surface to a depth less than said thickness; and
    a pump unit for feeding said polymer from at least one source to said device;
    wherein said spinning device is configured to form fibers such that when polymer flows through said spinning orifices at a low flow rate of 0.01 grams per spinning orifice per minute or less a majority of the formed fibers have a diameter less than 0.5 micron, said spinning orifices being long narrow spin holes having a length L and a maximum transverse dimension D and the ratio L/D is equal to or greater than twenty, said spinning orifices having a cross-section no greater than 0.005 inch wide and, in order to compensate for low productivity per spinning orifice resulting from said low flow rate, the spinning orifices are arranged at said outflow edge in a substantially linear array having a density greater than one hundred orifices per inch, and wherein said spinning device and said pump unit are configured to facilitate feeding of said molten polymer from said at least one source to said reservoir portion at said low flow rate or less.

14. The spinning device of claim 13, wherein the pump unit is configured to feed polymer through said device at operating pressures of at least 400 psi (lbs per square inch).

15. The spinning device of claim 2, wherein the spinning device is configured to feed polymer through said device at operating pressures of at least 400 psi (lbs per square inch).

16. The spinning device of claim 1, wherein said spinning device further comprises a second flow distribution plate having an outflow edge and a pattern of flow regions defined therein, wherein the first and second flow distribution plates are combined to form a single spinneret plate with spinning orifices defined at the flow regions formed within the first and second flow distribution plates.

17. The spinning device of claim 1, further comprising:
at least one flow divider formed within the reservoir portion of the first flow distribution plate and configured to divide a flow of polymer from the reservoir portion to the spinning orifices.

18. A nanofiber meltblown fiber spinning device into which molten polymer is fed comprising:
at least a first flow distribution plate having an outflow edge and a pattern of flow regions defined therein, said pattern of flow regions comprising a reservoir portion for receiving polymer fed to the device and a plurality of spinning orifices defined as respective long, narrow, parallel flow passages, said spinning orifices being positioned in flow communication with said reservoir and extending to said outflow edge such that nanofibers of said polymer are extruded from said spinning orifices, said plate having a plate thickness defined between first and second opposite plate surfaces, wherein said flow regions are grooves that include said spinning orifices and are recessed in said first surface to a depth less than said plate thickness;
wherein said spinning orifices are long and narrow spin holes having a cross-section no greater than 0.005 inch wide and are arranged in a substantially linear array having a density greater than one hundred holes per inch; and
wherein said spinning orifices have a length L and a maximum transverse dimension D, and the ratio L/D is equal to or greater than one hundred.

19. The fiber spinning device of claim 18 wherein the device is configured such that when polymer flows through said spinning orifices at a flow rate of 0.01 grams per spinning orifice per minute or less a majority of the formed fibers have a diameter less than 0.5 micron, and wherein L/D is between 100 and 1,000.

20. A nanofiber meltblown fiber spinning device into which molten polymer is fed from a polymer source to said device, said device comprising:
a first flow distribution plate having a first surface and an outflow edge and wherein multiple parallel spinning orifices are defined in said surface and terminate in a linear array at said outflow edge;
wherein said spinning orifices are long and narrow with a length L and a maximum transverse dimension D such that the ratio L/D is greater than twenty;
wherein said spinning orifices are configured such that when polymer from said polymer source flows through said spinning orifices at a low flow rate of 0.01 grams per spinning orifice per minute or less a majority of fibers flowing out from said spinning orifice at said outflow edge have a diameter less than 0.5 micron; and
wherein said long and narrow spinning orifices in said linear array are arranged in a high density greater than one hundred spinning orifices per inch to compensate for low productivity per spinning orifice resulting from said low flow rate.

21. The spinning device of claim 20 wherein said high density is at least two hundred spinning orifices per inch.

22. The spinning device of claim 20 wherein said L/D ratio is between one hundred and one thousand.

23. The spinning device of claim 20 wherein said D is no greater than 0.005 inch and said orifices are defined in said surface to a depth less than D.

24. A nanofiber meltblown fiber spinning device into which molten polymer is fed from polymer supply means to said device, said device comprising:
a first flow distribution plate having a first surface and an outflow edge and wherein multiple parallel spinning orifices are defined in said surface and terminate in a linear array at said outflow edge; and
wherein said spinning orifices are long and narrow with a length L and a maximum transverse dimension D such that the ratio L/D is greater than twenty and D is no greater than 0.005 inch.

25. The device of claim 24 wherein the density of said spinning orifices in said array is greater than one hundred spinning orifices per inch.

26. The device of claim 24 wherein D is approximately 0.005 inch and L is at least 0.3 inch.

27. The device of claim 24 wherein said L/D ratio is between one hundred and one thousand.

* * * * *